(12) United States Patent
Butler

(10) Patent No.: US 10,440,874 B2
(45) Date of Patent: Oct. 15, 2019

(54) FLEX ROLLER-CRIMPER FOR IMPROVED MANAGEMENT AND TERMINATION OF COVER CROPS AND OTHER PLANT MATERIAL

(71) Applicant: University of Tennessee Research Foundation, Memphis, TN (US)

(72) Inventor: Shawn Butler, Jackson, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 0 days.

(21) Appl. No.: 15/481,367

(22) Filed: Apr. 6, 2017

(65) Prior Publication Data

US 2017/0208730 A1 Jul. 27, 2017

Related U.S. Application Data

(63) Continuation-in-part of application No. 14/614,827, filed on Feb. 5, 2015, now abandoned.

(60) Provisional application No. 61/936,058, filed on Feb. 5, 2014.

(51) Int. Cl.

| | |
|---|---|
| *A01B 39/08* | (2006.01) |
| *A01B 29/04* | (2006.01) |
| *A01B 61/04* | (2006.01) |
| *A01C 7/00* | (2006.01) |
| *A01B 29/00* | (2006.01) |

(52) U.S. Cl.
CPC ............ *A01B 39/08* (2013.01); *A01B 29/045* (2013.01); *A01B 61/046* (2013.01); *A01C 7/006* (2013.01); *A01B 29/00* (2013.01); *Y02P 60/23* (2015.11)

(58) Field of Classification Search
CPC .............................. A01B 39/08; A01B 29/045
USPC ..................................................... 172/27, 554
See application file for complete search history.

(56) References Cited

U.S. PATENT DOCUMENTS

| | | | | |
|---|---|---|---|---|
| 704,897 | A * | 7/1902 | May ....................... | A01B 39/08 172/184 |
| 3,115,193 | A * | 12/1963 | Pullen .................... | A01B 35/16 172/177 |
| 4,091,878 | A * | 5/1978 | Steketee .............. | A01B 29/048 172/147 |
| 4,554,977 | A * | 11/1985 | Vachon ................ | A01B 29/046 172/177 |
| 5,622,227 | A * | 4/1997 | McDonald .......... | A01B 49/027 172/146 |
| 5,725,057 | A * | 3/1998 | Taylor ................... | A01B 29/04 172/121 |
| 6,068,061 | A * | 5/2000 | Smith et al. .......... | A01B 13/08 172/139 |

(Continued)

*Primary Examiner* — Thomas B Will
*Assistant Examiner* — Joel F. Mitchell
(74) *Attorney, Agent, or Firm* — Synthesis Intellectual Property; Samuel Brown

(57) ABSTRACT

An agricultural device that can include a frame; and a plurality of roller-crimping devices supported by the frame arranged in at least one row oriented in a direction that is transverse to a direction of travel of the agricultural device. Each of the plurality of roller-crimping devices having an exterior surface configured to at least partially crush stems of residual plant matter, and being individually movably mounted to the frame such that each of the plurality of roller-crimping devices will move at least vertically with respect to the frame when subjected to a temporary increase in resistance caused by an encounter with a non-uniform region in the field.

14 Claims, 12 Drawing Sheets

(56) References Cited

U.S. PATENT DOCUMENTS

| | | | | |
|---|---|---|---|---|
| 6,539,697 B2 * | 4/2003 | Burk | ................... | A01D 34/8355 |
| | | | | 56/504 |
| 6,681,868 B2 * | 1/2004 | Kovach et al. | ......... | A01B 13/08 |
| | | | | 172/146 |
| 6,968,907 B1 * | 11/2005 | Raper et al. | .......... | A01B 29/045 |
| | | | | 172/518 |
| 8,430,179 B2 * | 4/2013 | Van Buskirk et al. | ....................... | |
| | | | | A01B 29/048 |
| | | | | 111/139 |
| 9,668,398 B2 * | 6/2017 | Bassett | ................ | A01B 49/027 |

* cited by examiner

FLEX ROLLER-CRIMPER FOR IMPROVED MANAGEMENT AND TERMINATION OF COVER CROPS AND OTHER PLANT MATERIAL

CROSS-REFERENCE TO RELATED APPLICATIONS

This disclosure claims the benefit of priority to application Ser. No. 14/614,827, filed Feb. 5, 2015, which claims the benefit of priority to U.S. Provisional Patent Application No. 61/936,058 filed Feb. 5, 2014, the disclosures of each are incorporated herein in their entirety.

TECHNICAL FIELD

This invention relates to agricultural devices, more directly relating to field preparation for planting or sowing cash crops in no-tillage cropping systems where cover crops, undesirable plants, or plant residue exist by means of an improved modular apparatus for roller-crimping.

BACKGROUND OF THE INVENTION

Since the development of "no-till" farming, researchers, consultants, and growers have adopted the practice for its economic and environmental benefits. "No-till" practices consist of managing cash crops with minimal to no tillage used, and inversely relies on herbicides to manage undesirable plants. No-till farming offers many positives, such as reducing erosion, water runoff, as well as fuel, time, and labor costs. However, no-till practices still possess issues. Since the fields are not tilled, soils become compacted, which severely reduces the ability of water to filter through the soil. In turn, soil compaction reduces crop yield. In areas in which soil compaction occurs and there are limited amounts of plant residue on the soil surface, water runoff occurs. Water runoff not only results in unused water, it also moves residual pesticides away from the targeted area and causes soil erosion. Also, due to the heavy reliance on herbicides to manage undesirable plants, some of these plants have acquired herbicide resistance, making them both challenging and costly to manage.

In order to combat issues caused by no-till farming, the use of cover crops is gaining popularity. Cover crops are simply plants grown in an area for economic and environmental benefits while the cash crop is not being cultivated. Cover crops typically are grass, legume, or *brassica* species. Cover crops help to minimize erosion by introducing large amounts of plant residue on the soil surface. Cover crops also help to reduce soil compaction by making the soil more penetrable with their root systems. Cover crops help to suppress weeds by competing for water, sunlight, and soil nutrients. Cover crops also add soil organic matter, creating a more fertile growing medium for cash crops. Additionally, some cover crops, such as many legume species, fixate nitrogen in the soil through a symbiotic relationship with *Rhizobium* bacteria on their root systems that convert nitrogen gas from air in the soil into ammonium that can be used by the cash crop. Cover crops such as wheat, rye, barley, and oats also give a grower the option to harvest for grain if they desire.

Although cover crops offer many attractive benefits, inefficient methods of termination are slowing their adoption rate. Typically, cover crops are terminated by means of chemical herbicides. However, in some scenarios, such as organic farming, herbicides may not be an option. Alternately, cover crops and undesirable plants can also be terminated by means of a roller-crimper.

Currently, a roller-crimper is an elongated, hollow cylinder with fixed blades evenly spaced around the cylinder in a chevron or helical arrangement. It is used to roll over and press cover crops or plant material and evenly crimp or pinch the stems of the plants, preventing translocation of water and nutrients, resulting in termination of the plant. Current roller-crimpers range from 5 feet in length to 15 feet in length, but can be custom built up to 40 feet in length. A roller-crimper is typically attached to the three-point hitch on the front or rear of a tractor or attached to a drawbar and pulled behind a tractor. Roller-crimpers ranging from 5 feet to 15 feet in length can be attached to the front of the tractor, rolling and crimping cover crops during planting. However, current commercial roller-crimpers over 15 feet in length require an individual pass to be made to roll and crimp the cover crop before the planter is able to sow seed of the desired cash crop. Growers then unhook the implement from the tractor and load the roller-crimper on a separate trailer for transportation.

A roller-crimper crushes and terminates cover crops or plant material and evenly crimps the stems of the plants, preventing translocation of water and nutrients. However, current roller-crimpers are not effective on uneven surfaces and slopes, because the roller-crimper is unable to make uniform contact with the ground unless the surface is perfectly flat. Also, current roller-crimpers do not allow a grower to leave living cover crops or plant biomass in between the planted rows of the cash crop. The pressure acted upon the pinching point of the ground and the plants stem currently is only mediated by the weight of the roller, or weight added to the roller. The ability to quickly adjust pressure as needed is not available.

As interest in the use of cover crops continues to increase, a crucial part of a cover crop system is how to terminate the cover crop prior to or during planting. Also, there is a need for an improved method of creating a better surface when planting into or managing in-season existing undesirable plants or harvest residue in double-crop systems. A flex roller-crimper has been designed for three purposes: terminating living cover crops broadcast or in strips, roller crimping existing undesirable plants broadcast or in strips, or roller crimping harvest residue broadcast or in strips in double-crop systems.

SUMMARY OF THE INVENTION

A flex roller-crimper is disclosed. The flex roller-crimper is comprised of a modular system of cylindrical drum units mounted to a frame by a mounting plate, parallel linkage, and an adjustable tension mechanism. The flex roller-crimper system consists of two types of drum units, a strip unit and a row middle unit. Each modular roller crimper system is attached to the frame separately, having the capability of being individually movably mounted to the frame, individually pivoting up and down perpendicular to the ground based upon topography of the surface in which it contacts, or to be lifted in a storage position in instances in which it is not being used. The strip unit terminates and manipulates cover crop, plant material, or harvest residue within the area of which the cash crop will be planted in a row without disturbing the soil surface. The strip unit consists of but is not limited to about 4 to about 8 inch diameter roller cylinder, with about 1 to about 4 inch blades in height, spaced in even increments of about 2 to about 6 inches around the roller cylinder and is about 10 to about 20 inches wide. Even spacing of blades creates an improved contact surface to minimize vibration. Blades may be arranged but are not limited to chevron, discontinuous-overlapping-offset semi-chevron, or not present, such that the roller is a smooth surface. The row middle units terminate and manipulate cover crop, plant material, or harvest residue within the area that would fall in between rows of planted desired cash crops without disturbing the soil surface. The row middle unit consists of but is not limited to an about 4 to about 8 inch diameter cylinder, with about 1 to about 4 inch blades in height, spaced in even increments of about 2 to about 6 inches around the cylinder and is about 10 to about 30 inches wide. Blades may be arranged but are not limited to chevron, discontinuous-overlapping-offset semi-chevron, or not present, such that the roller is a smooth surface. Drum units possess a rigid mounting plate offset within the inside diameter of the cylinder between about 1 to about 4 inches to house a bearing assembly. Flange bearings or other bearing assemblies may be bolted, fastened, or connected to the mounting plate on both sides of the roller. Bearings can be positioned, pressed, or attached by other means know in the art onto a shaft positioned in the center of the drum unit, providing a rotational axis point for the drum unit.

The flex roller-crimper system can be attached to a frame in multiple ways including strip units alone, row middle units alone, or both strip units and row middle units. One embodiment utilizes strips units attached to a frame alone to terminate and manipulate cover crop, plant material, and harvest residue within the area of which the cash crop will be planted in a row prior to planting a cash crop or during the act of seeding the cash crop without disturbing or tilling the soil surface.

Another embodiment utilizes the row middle units attached to a frame alone to terminate and manipulate cover crop, plant material, and harvest residue within the area located in between rows of planted desired cash crops after crops have emerged from the soil without disturbing or tilling the soil surface.

Another embodiment utilizes both the strip and row middle units attached to a frame with the purpose of broadcast terminating or manipulating cover crops, plant material, and harvest residue prior to planting a cash crop or during the act of planting a cash crop without disturbing or tilling the soil surface over the entire swath of the implement. In this embodiment, both the strip and row middle drum units are arranged in dual rows comprised of a first row and a second row. The first row of drum units of the dual row is located in front of the second row of drum units in an offset configuration. The first row of drum units of the dual row may be located slightly in front of the second row of drum units in an offset configuration. Drum units are attached to the frame and located alternately between each row so that each adjacent drum unit is located in a different row than its adjacent neighbor drum unit. One of the dual rows is comprised of the strip roller-crimper drum units that roll and crimp the area to be planted known as the planted row. The strip unit, when attached to a planter, is oriented in front of each individual planter row unit and may be oriented directly in front of each individual planter row unit. The other row of the dual rows is comprised of the row middle roller-crimper drum units that roll and crimp the row middle. The row middle unit when attached to a planter is oriented in between each individual planter row unit. Drum units are attached and arranged such that they will not contact the same areas of cover crop, plant material, or ground surface to minimize disturbance of the previously rolled material. When one roller width ends, the neighboring roller edge begins, with no such overlapping from the front, top, or back view of the implement.

The frames to which the modular flex roller crimper system can consist of but are not limited to planters to terminate and manipulate cover crop, plant material, or harvest residue simultaneously while planting the cash crop. The modular flex roller-crimper system may be bolted, fastened, or connected directly to the frame, toolbar, or planter row unit by a mounting plate. The modular flex roller-crimpers comprising a drum unit, a mounting plate, and the tensioning mechanism to apply upward or downward pressure are connected to the individual application by a parallel arm linkage system, which may be V-link or telescoping, and may also possess stalk guide separators. The rearmost portion of the arm of the V-link parallel linkage system is bolted, fastened, or connected to the mounting plate. Pivoting of the entire flex-roller crimper system is enabled by rotational capabilities of the V-link attachment point to the mounting plate. The bottom bend section of the V-link possesses a hole allowing for a shaft to be slid through from accompanying sides as well as sliding through the inside diameter of the roller mounted bearing creating an axis for the roller to rotate around. The uppermost portion of the V-link possesses a rigid connection to each side by a crossmember. In the center of the crossmember, a fastening point is located such that a tensioning system can be attached. The tensioning system most commonly consists of a pressure regulator. The pressure regulator is attached to the crossmember, fastening point on the stroke end and the mounting plate on the bore end, in which the mounting plate is attached to the planter row unit frame, on the other end, running about parallel to the ground. The positioning of the pressure regulator at its two fastening points allows for tensioning mechanism to run parallel to the ground surface. This positioning of the pressure regulator eliminates disruption of normal functions of the attached implement, such as a planter. By pushing rearwards against the direction of movement, no force is applied upward or downward to the primary implement, such as a planter, minimizing the effect to planter operation that would be caused by the pressure regulator being run perpendicular to the ground. The pressure regulator creates either free-floating, downward, or upward tension of the roller drum unit against the plant material and ground, providing a medium for the drum unit to adjust in height position based upon topography with consistent desired pressure. The pressure regulator may also be fully contracted to lift the roller drum unit from the ground to be positioned into a storage mode. The telescoping parallel linkage consists of a mounting plate with fixed, rigid open channels protruding frontward away from the frame in which it is attached at a 15°-60° degree angle. The parallel arms, which are connected to the drum roller on the frontward end, telescope into the open channels of the mounting plate. The channels possess open slots, such that a stop bolt, pin, or fastener is inserted into to the telescoping parallel arms after they have been positioned within the open channel from the side, acting as a guide for the telescoping movement of the parallel arms that prevents the arms from sliding out of the open channels when fully extended. The two adjacent parallel arms have a fixed upward beam, connecting both arms by means of a crossmember. A pressure regulator is attached to the mounting plate on the bore side and the crossmember on the stroke side. The pressure regulator mediates pressure as the roller unit adjust in height depicted by the topography of the ground in which it contacts. As the roller drum moves upward, the parallel arms slidably retract within the inside of the open channels of the mounting plate. As the roller drum moves downward, the parallel arms slidably extend outward of the open channels. The pressure regulator is fixed in an angular position such that it is parallel to the ground surface. The pressure regulator creates surface tension of the roller drum against the plant material and ground in which it contacts. The pressure regulator extends, causing the telescoping parallel arms to extend in the event the roller drum would need to be lowered, conversely, the regulator retracts, causing the telescoping arms to retract when the roller drum would need to be raised. This allows for an adjustable pressure medium, such that an established desired force is constantly acting upon the plant material and ground surface by the roller drum unit regardless of plant density, topography, etc. By positioning the pressure regulator parallel to the ground surface, resisted force created by the roller drum traversing across varying terrain is applied in a rearward motion, which does not affect the main implement, such as a planter. By regulating resisted force frontward and rearward, in comparison to upward and downward, no effect on the implement, such as a planter row unit which is placing seeds in the ground at a specific set depth requirement, is created. The pressure regulator may also be fully contracted to lift the roller drum unit from the ground to be positioned into a storage mode. The tensioning device may be a pressure regulator such as a hydraulic cylinder, pneumatic cylinder, an air cylinder or an actuator and cylinder. Stalk guide separators may be bolted, fastened, welded, or attached to the respective parallel arms at the bottom area near the drum unit shaft hole. Stalk guide separators are advantageous in the event the user would like to guide cover crop or plant material into the area of the roller drum unit for increased contact and minimize disturbance during the rolling and crimping. Stalk guide separators trajectory is frontward and depending on application may be rotated by adjustments to be set at the appropriately desired angle.

DETAILED DESCRIPTION OF THE INVENTION

It should be understood that the present disclosure is to be considered as an exemplification of the present invention, and is not intended to limit the invention to the specific embodiments illustrated. It should be further understood that the title of this section of this application ("Detailed Description of the Invention") relates to a requirement of the United States Patent Office, and should not be found to limit the subject matter disclosed herein. References made to certain directions such as "front" and "rear" are made as viewed from the frontward or rearward perspective of the flex roller-crimper system. References made to "planted row" are viewed as the area in which seeds are sewn in a line forming a row. References made to "row middle" are viewed as the areas in between two planted rows in which seeds are sewn in a line. References made to "strip unit" are describing the flex roller crimper system attached to a planter row unit, traversing over the planted row. References made to "middle unit" are describing the flex roller crimper system attached to a toolbar, traversing over the terrain area in between the planted row or emerged crop rows. References made to "v-link" are made to the parallel arms designed specifically for a flex roller crimper system.

Figure 1:
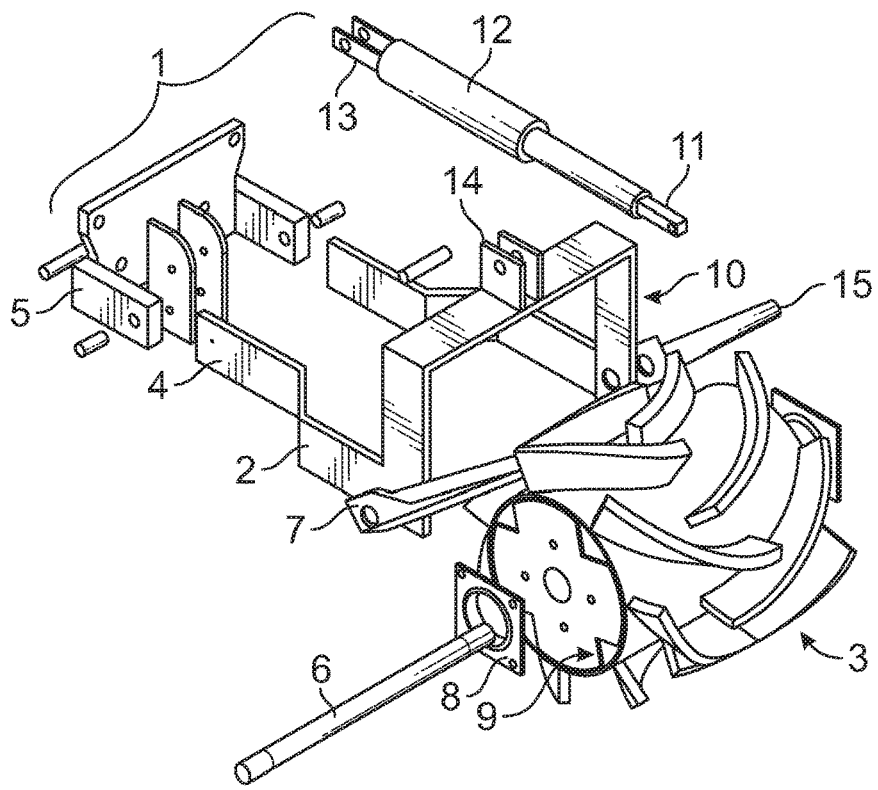
FIG. 1 shows an exploded front angled view perspective of an embodiment of the components of the flex roller crimper system with V-link parallel arms and stalk guide separators.

FIG. 1 shows an embodiment of a modular agricultural device according to the present disclosure in an exploded format. The agricultural device includes a mounting plate 1 providing a basis in which the device can be attached to an agricultural implement. V-Link parallel arms 2 provide a connection link between the mounting plate 1 and the roller drum with but not limited to overlapping, discontinuous, semi-chevron blade arrangement 3 (shown), chevron, or no blades (not shown). V-Link arms 2 attach to the mounting plate 1 on the rearward side 4. A pivotable connection such as a bolted connection or other means as known in the art allows for a pivoting point 5 in which the height of the device can be adjusted based upon the topography of the ground in which it contacts while rotating around the drum shaft 6. The roller drum shaft 6 is positioned through a hole 7 on corresponding sides of the middle fork of the V-link arms 2 and drum flange bearings 8 bolted to the end caps 9 of the roller drums 3. The frontward section of the V-link arms 2 possesses a rigid crossbar connection 10 in which the two parallel arms are attached and has a connection point 10 for attachment of the stroke side 11 of the tensioning device 12 to bolt. The tensioning device 12 generates downward or upward force to monitor the amount of pressure the roller drum 3 is creating on the ground surface. The bore side 13 of the pressure regulator 12 bolts or is attached to the mounting plate 1. The positioning of the pressure regulator 12 is roughly parallel to the ground surface in which the roller drum is traversing. The tensioning device may be a pressure regulator such as a pneumatic cylinder, hydraulic cylinder, an air cylinder or an actuator and cylinder. The bore side 13 of the pressure regulator 12 pushes or pulls rearward against the agricultural implement in which it is installed. The stroke side 11 of the pressure regulator 12 pushes or pulls forward against the crossbar 10 of the V-link 2, causing a rotational pivot at the opposite end 4 in which it is bolted or otherwise attached to the mounting plate 5. By pushing rearward or rearward in comparison to upward or downward, the application or function of the agricultural implement in which the system is attached is minimally to not effected. The V-link arms 2 may but are not required to be equipped with stalk guide separators 15, extruding frontward away the front side of the drum unit. The stalk guide separators are attached on the rearward side to the roller drum shaft 7 on both adjacent sides and extrudes, but is not limited to, about 6 to about 12 inches frontward. The stalk guide separators are a tubular, rod-like structure used for the purpose of guiding cover crop or other plant material towards the roller drum unit to improve contact of the cover crop or plant material by the roller drum and minimize clogging, matting, twisting or other undesired actions of the plant material.

Figure 2:
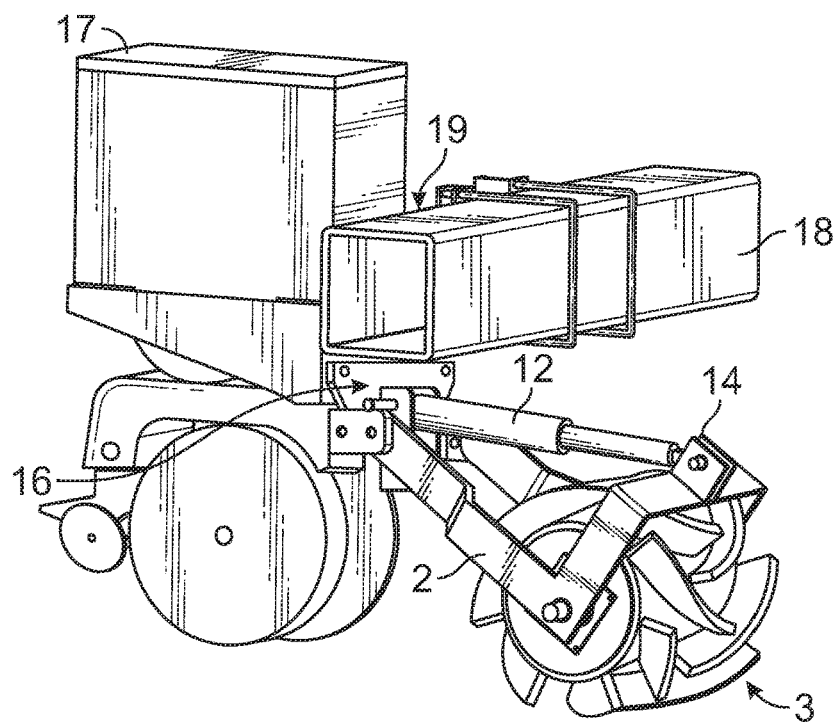
FIG. 2 shows a front angled view perspective of a modular flex roller crimper attached to a no-till planter row unit, with a discontinuous, overlapping, semi-chevron blade arrangement roller.

FIG. 2 illustrates a modular flex roller crimper strip unit system installed on a no-till planter row unit. Components of the flex roller crimper system are within the scope of this disclosure (FIG. 1). The flex roller crimper strip unit system is bolted to the planter row unit by mounting plate 16. A planter row unit 17 understood by those skilled in the art for the purpose of sewing crop seeds within the ground is attached to a toolbar 18 by parallel arms 19 which allow for height adjustment of the planter row unit based upon ground topography in which the components are traversing, conversely allowing for necessary basis adjustments in height of the mounting plate of the flex roller crimp strip unit system. When the drum roller is contacting the ground, V-link arms 2 are able to pivot up or down at the bolted point to the mounting plate 16, opposite the direction the mounting plate 16 will be moving as depicted by changes in the height of the planter row unit 16 attached to the toolbar 18 by the parallel arms 19. Desired down pressure is regulated by pressure regulator 12 bolted to the mounting plate 16 and crossbar of the V-link arms 14 by the pressure regulator 12 extending or retracting. The extending or retracting of the pressure regulator 12 at the crossbar of the V-link arms 14 causes the drum roller height to be adjusted upwards or downwards. The drum roller 3 is able to turn in a clockwise rotation around the drum roller shaft axis 6 as the planter or other implement is pulled through the field by a tractor or vehicle. The roller drum may be but is not limited to about 6 to about 8 inches in diameter with about 1 to about 2 inch blades. Widths of the rollers are determined based upon row spacing ranging from about 10 to about 20 inches.

As further shown, frame/toolbar 18 includes components associated with a conventional no-till planter row unit. However, the frame/toolbar 18 is not limited to a planter, and may be incorporated into a different agricultural implement or device.

Figure 3:
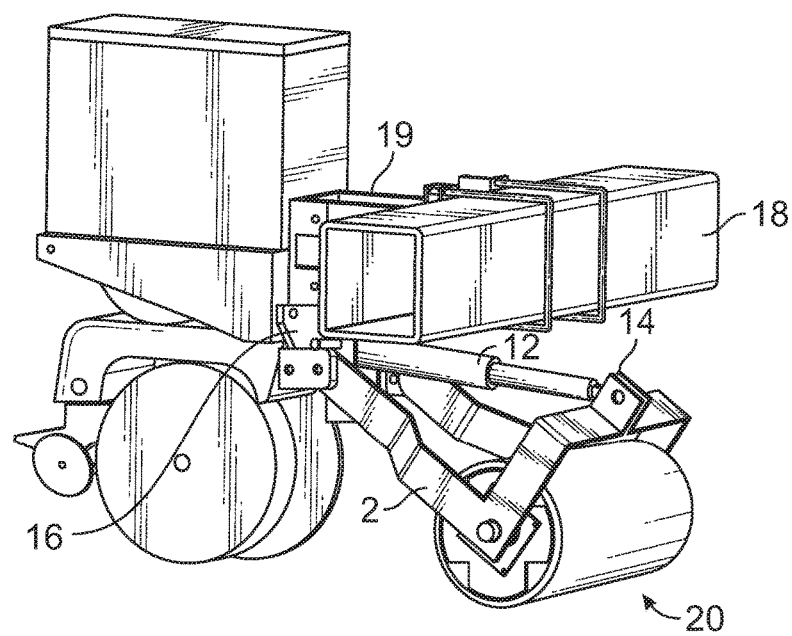
FIG. 3 shows a front angled view perspective of a modular flex roller crimper attached to a no-till planter row unit, with a smooth roller.

FIG. 3 illustrates a modular flex roller crimper strip unit system installed on a no-till planter row unit. Components of the flex roller crimper system are described within the scope of this disclosure (FIG. 1 & FIG. 2). FIG. 3 illustrates a flex roller crimper strip unit system equipped with a smoother drum roller 19 that has no rigid blades attachments. A smooth drum roller 21 may be desired in the event that herbicides will be utilized to terminate the cover crop or other plant material. The smooth drum roller 19 provides the user the ability to lay over plant material in the direction of the implement movement such that material does no negatively impact the plants during the emergence period.

Figure 4:
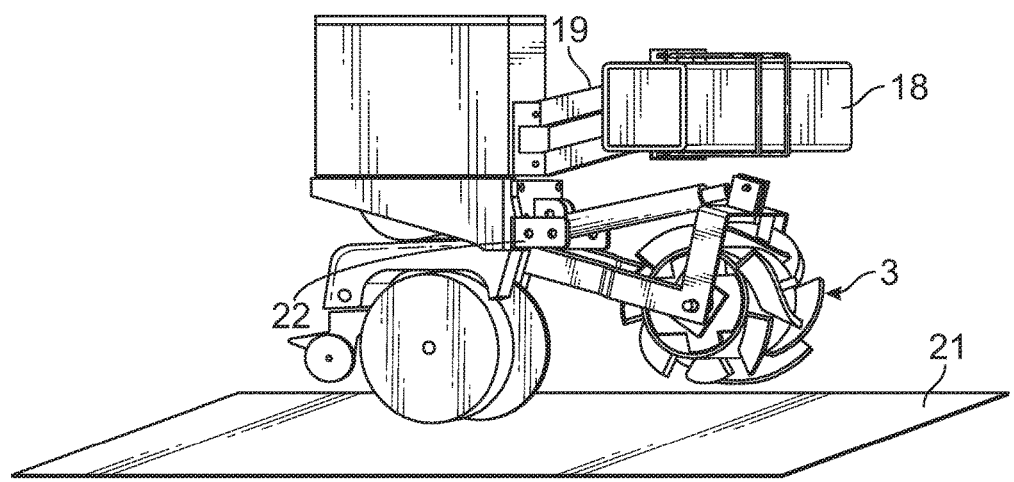
FIG. 4 shows a front angled view perspective of a modular flex roller crimper system attached to a no-till planter row unit lifted into storage position.

FIG. 4 illustrates a modular flex roller crimper strip unit system installed on a no-till planter row unit lifted into storage mode. Components of the flex roller crimper strip unit system installed on a planter row unit are described within the scope of the disclosure. The ground 21 defined as the soil surface medium in which seeds are to be sewn depicts the height changes of the planter row unit attached to a toolbar by parallel arms 19 which allow for the unit to move upwards and downwards. In the event the user would like to use the planter row unit without the flex roller crimper, the pressure regulator 12 retracts pulling rearward at the attachment point to the v-link crossbar 16 lifting the v-link arms 2 and attached drum roller 3 into a position not contacting the soil surface. This could also be beneficial during transport of the planter or respective implement. When the pressure regulator retracts, the v-link arms are able to pivot at the bolted point 22 to the mounting plate.

Figure 5:
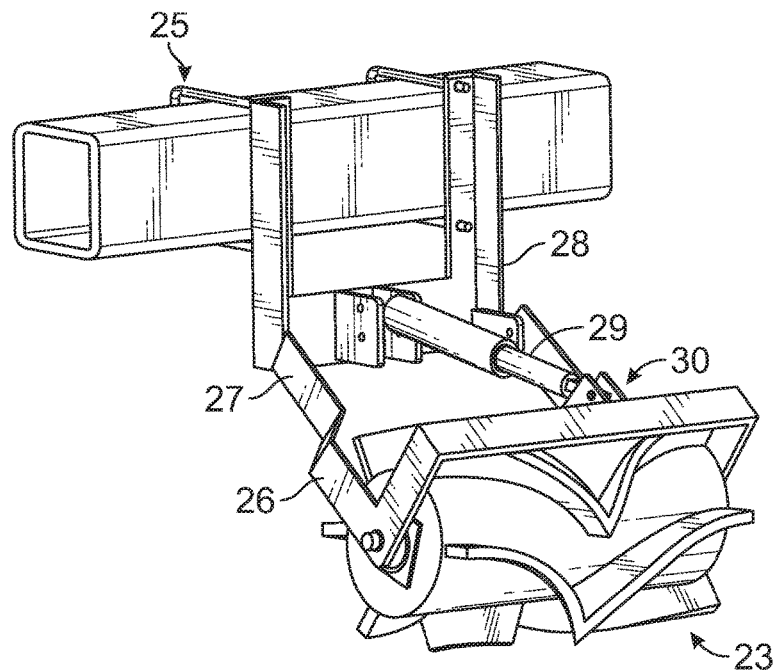
FIG. 5 shows a front angled view perspective of a flex roller crimper middle unit, with a chevron blade arrangement drum, attached to a toolbar.

FIG. 5 illustrates a modular flex roller crimper middle unit system installed on an agricultural toolbar. Components of the flex roller crimper system are described within the scope of this disclosure. The middle unit roller drum 23 possesses but is not limited to a chevron arrangement. The middle unit system bolts directly to the toolbar of a conventional no-till planter or other agricultural implement. The middle unit mounting plate 24 is bolted to the toolbar by square lug u-bolts 25 which wrap around the outside surface of the toolbar. The middle unit mounting plate may be otherwise attached by means known in the art. The middle unit roller drum 23 is attached to the v-link arms 26 by a shaft 28 about which it is able to rotate around based upon the direction of the implement is traveling through the field. The middle unit height is adjusted as the parallel v-link arms 26 pivot up and down at the bolt position to the mounting plate 24. Height of the middle unit is influenced by the topography of the ground in which the roller drum is traversing. In order to establish desired down pressure, a pressure regulator 29 is bolted or otherwise attached as known in the art to the mounting plate and v-link crossbar 30. The desired down pressure is initiated by compressed air within the pressure regulator 29. As the middle unit roller drum 23 raises, the pressure regulator retracts. Conversely, as the middle unit roller drum 23 drops, the pressure regulator 29 extends. Both scenarios maintain desired pressure, creating proper force against the ground surface by the roller drum. Middle unit roller drums are, but not limited to, about 6 to about inches in diameter with about 1 to about 2" blades. Drum widths are determined by row spacing ranging from about 10 to about 30 inches.

Figure 6:
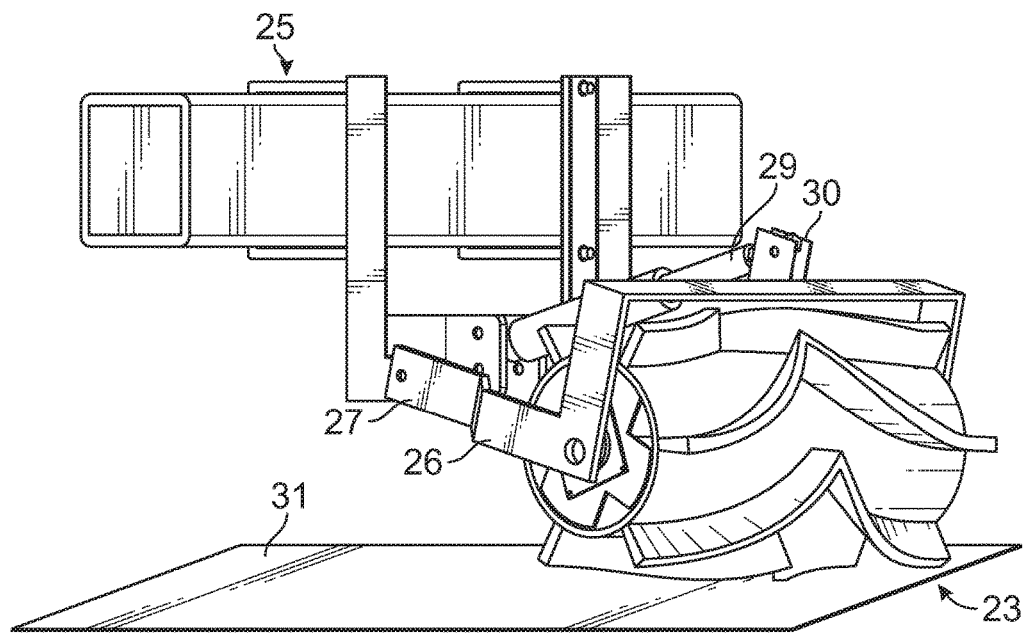
FIG. 6 shows a front angled view perspective of a flex roller crimper middle unit attached to toolbar lifted into storage position.

FIG. 6 illustrates a modular flex roller crimper middle unit system installed on a toolbar lifted into storage mode. A flex roller crimper middle unit is described in FIG. 5. The ground 31 refers to the soil surface in which the middle unit roller drum contacts. The middle unit roller drum 23 may be lifted into a storage position when not in use. The pressure regulator 29 retracts lifting the middle unit roller drum 23 off of the soil surface 31 by pulling rearward at the crossbar connection 27. V-link arms 26 are able to pivot upward by rotating at the bolt point 27 to the mounting plate.

Figure 7:
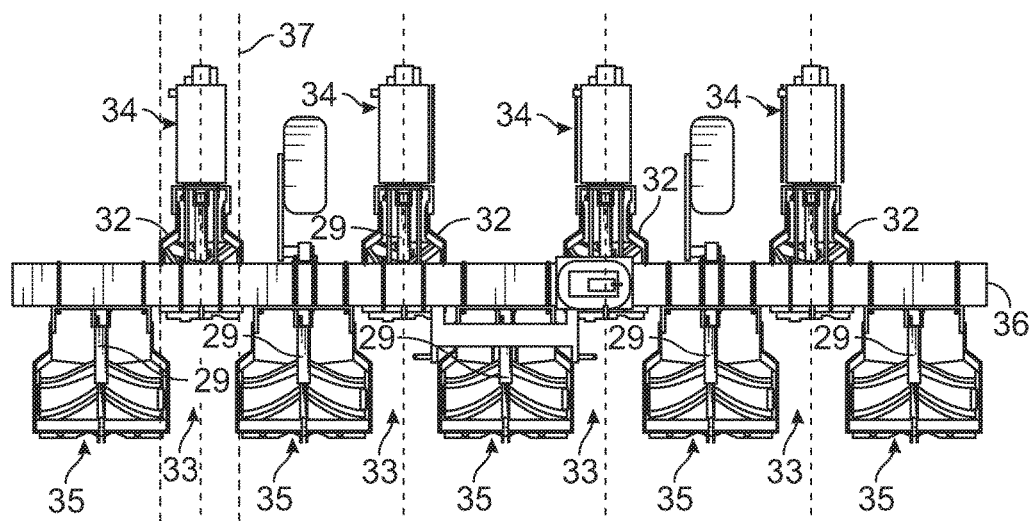
FIG. 7 shows a top view perspective of an embodiment of a flex roller crimper system attached to a no-till planter demonstrating alignment and orientation of drum units.

FIG. 7 illustrates an embodiment of a conventional no-till planter with a flex roller crimper system installed from a top view perspective. The finely dotted lines 33 represent seeds placed in the furrow of the planted row. The strip units 32 are attached to the planter row unit 34, covering the area of the planted row 33. The middle unit 35 attached to the toolbar 36, covers the area in between the planted rows 35. The dotted line 37 illustrates the offset arrangement of the strip and middle units. The units do not overlap, nor is there between rollers. Rollers are arranged such that no space or overlap occurs. As a middle unit 35 ends, a strip unit 32 begins directly in line with the adjacent roller. An air compressor system containing a pump, tank, and various pressure regulators are installed to the toolbar 36 of a conventional no-till planter for the purpose of providing compressed air to the pressure regulators of the flex roller crimper system and maintaining desired pressure while in use.

Figure 8:
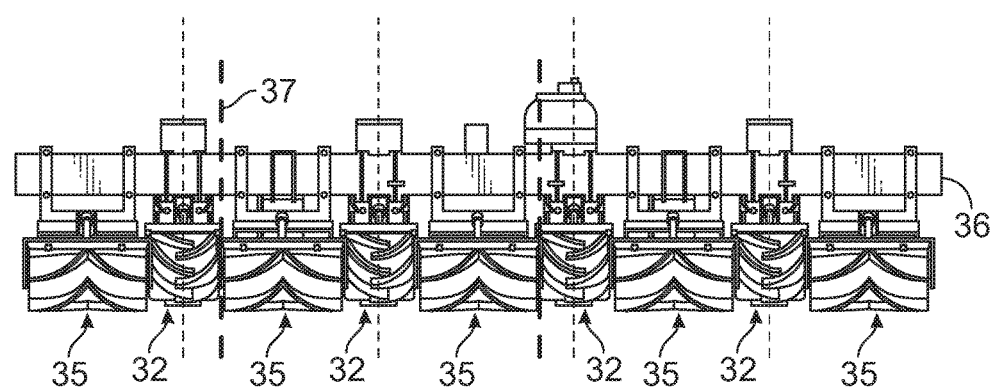
FIG. 8 shows a front view perspective of an embodiment of a flex roller crimper system attached to a no-till planter demonstrating position of planted row in regards to strip unit placement as well as alignment of drum units.

FIG. 8 further illustrates alignment of the flex roller crimper system installed on no-till planter from a front view perspective. The strip units 32 are attached to the planter row unit 34, covering the area of the planted row 33. The middle unit 35 attached to the toolbar 36, covers the area in between the planted rows 35. The dotted line 37 illustrates the offset arrangement of the strip and middle units. The units do not overlap, nor is there between rollers. Rollers are arranged such that no space or overlap occurs. As a middle unit 35 ends, a strip unit 32 begins directly in line with the adjacent roller. Any planting row size can be accommodated by adjusting the size of the drum units and the aforementioned planting row spacing is not meant to be limiting rather the examples are only meant to be exemplifications of the disclosed flex roller-crimper.

Figure 9:
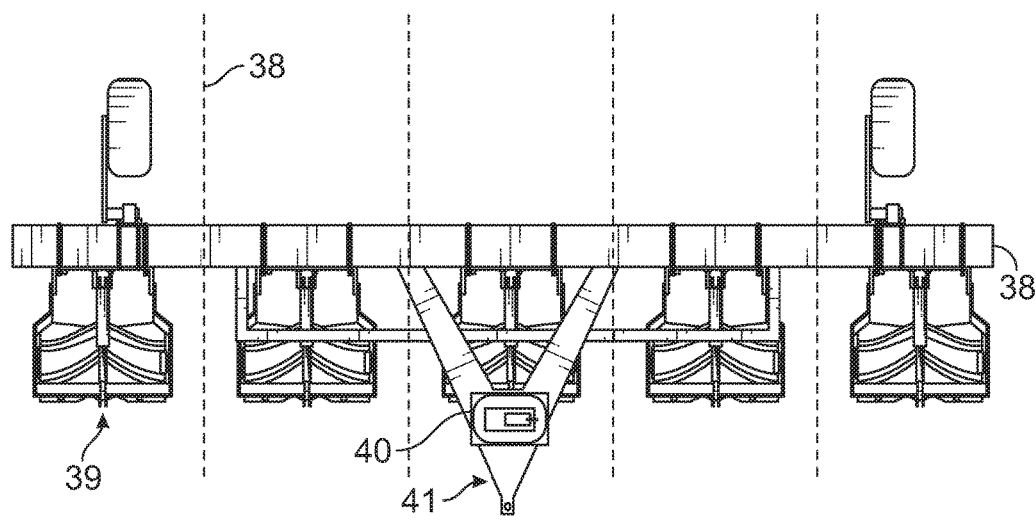
FIG. 9 shows a top view perspective of an embodiment of a flex roller crimper standalone system attached to a toolbar demonstrating alignment of drum units in regards to emerged crop rows.

FIG. 9 illustrates an embodiment of a flex roller crimper system attached as a standalone to a toolbar 38 from a top view perspective. The dotted line represents emerged crop plants (38) in rows. The middle units 39 attached to the toolbar cover the area in between the emerged plant rows. A gap is provided between middle roller drums such that emerged plants are not affected during use. The flex roller crimper middle rollers are about 10 inches to about 38 inches in width based upon row spacing. The gap distance between middle roller drums is determined by the width of the emerged crop plant. An air compressor system 40 containing a pump, tank, and various pressure regulators are installed to the toolbar of a conventional no-till planter for the purpose of providing compressed air to the pressure regulators of the flex roller crimper system and maintaining desired pressure while in use. As shown, the agricultural device includes a tongue or draw bar 41 that is towed by a vehicle such as a tractor (not shown). In one embodiment, the agricultural device may be operatively connected, i.e., towed by or otherwise secured to a vehicle, such as a tractor or apparatus generally or specifically configured for use with the agricultural device, and may be used with another implement or application, or used without another implement. In other words, the agricultural device may be operatively connected to either an implement or to a vehicle, although the agricultural device may be used by itself or in combination with another implement. It is to be understood while other machines or apparatus may also be operatively connected to the agricultural device or to a vehicle, such as a tractor or apparatus generally or specifically configured for use with the agricultural device, the other machines or apparatus may or may not be used in combination with the agricultural device.

Figure 10:
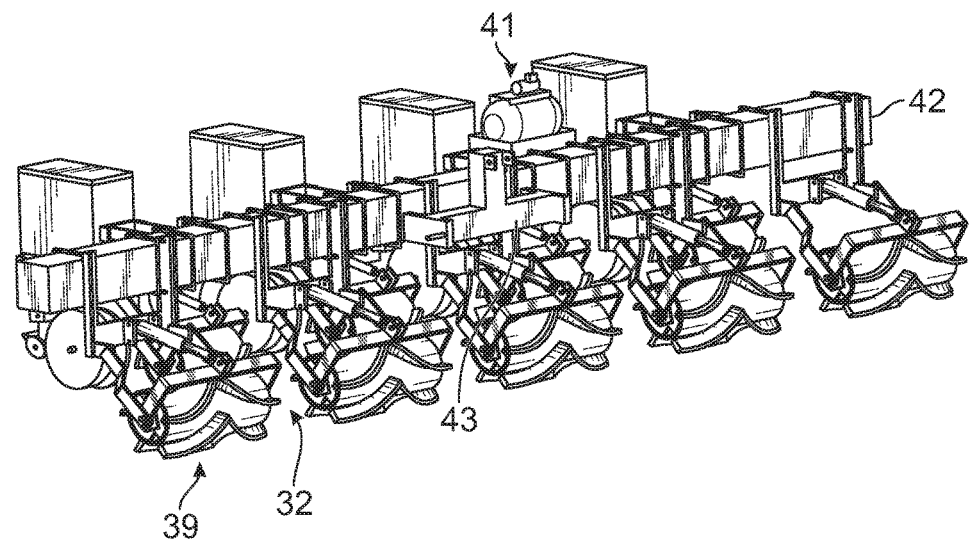
FIG. 10 shows a front angled view perspective of an embodiment of a flew roller crimper system attached to a no-till planter with a 3-point hitch attachment for connection to a tractor, as well as an air compressor and solenoid for the purpose of supplying air to the pressure regulators of the flex roller crimper system.

FIG. 10 illustrates an embodiment of a flex roller crimper system having a strip units and middle units installed on a no-till planter with a 3-point hitch. An air compressor system 41 containing a pump, tank, and various pressure regulators are installed to the toolbar 42 of a conventional no-till planter for the purpose of providing compressed air to the pressure regulators of the flex roller crimper system and maintaining desired pressure while in use. A 3-point hitch 43, known by those skilled in the art, is mounted to the front of the no-till planter providing attachment ability to a tractor or vehicle to pull the implement in a forward direction through the field.

Figure 11:
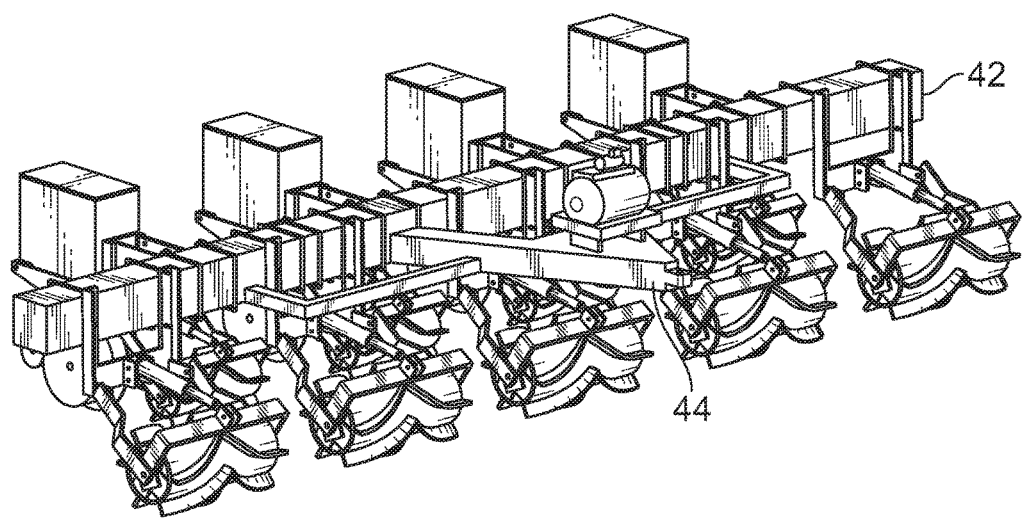
FIG. 11 shows a front angled view perspective of an embodiment of a flex roller crimper system attached to a no-till planter with a drawbar for connection to a tractor or vehicle.

FIG. 11 illustrates the same conventional no-till planter as FIG. 10 with a drawbar mount 44 attached to the toolbar 42 of the no-till planter providing a mechanism to attach the planter to the drawbar of a tractor or vehicle to pull the implement through the field. Any planting row size can be accommodated by adjusting the size of the drum units and the aforementioned planting row spacing is not meant to be limiting rather the examples are only meant to be exemplifications of the disclosed flex roller-crimper. The frame may be a toolbar or other suitable field transport system. The flex roller-crimper can be attached to a planter or tractor by suitable means such as a category II or III, narrow or wide bolt on with or without adjustable links, a T-shaped mounting bracket on the frame. The point of attachment may also be a customized control arm or a pneumatic, hydraulic, spring, or fixed tensioner. Other suitable means for attachment are within the scope of this disclosure.

Figure 12:
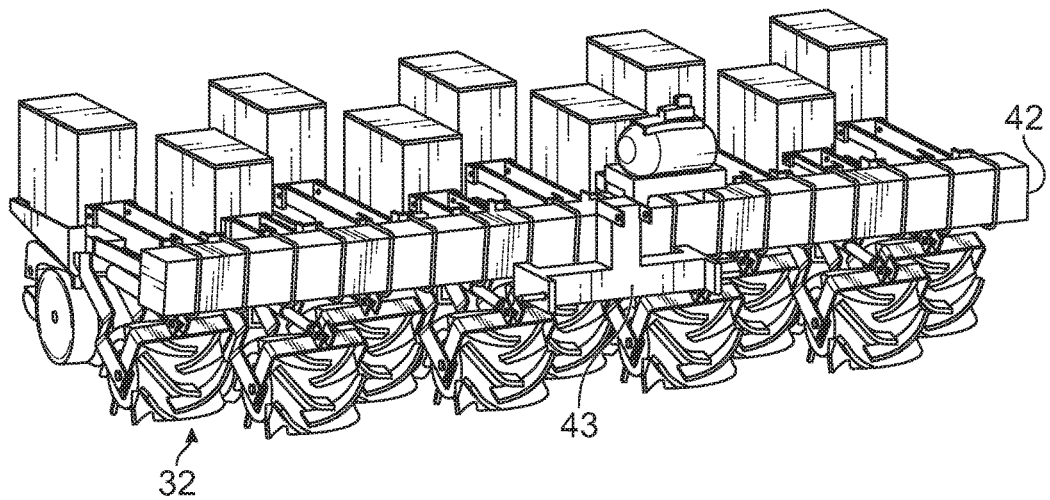
FIG. 12 shows a front angled view perspective of an embodiment of flex roller crimper strip units attached to each individual planter row unit of a no-till center-plant planter.

FIG. 12 illustrates an embodiment of a center plant no-till planter with flex roller crimper strip units installed. Center plant no-till planters, known by those skilled in the art, allow for flex roller crimper strip units 32 to be attached to each respective planter row unit without the need for middle units while still providing broadcast ground coverage across the entire span of the planter. Center plant planters may be attached by but not limited to 3-point hitch 43 or drawbar (not shown).

Figure 13:
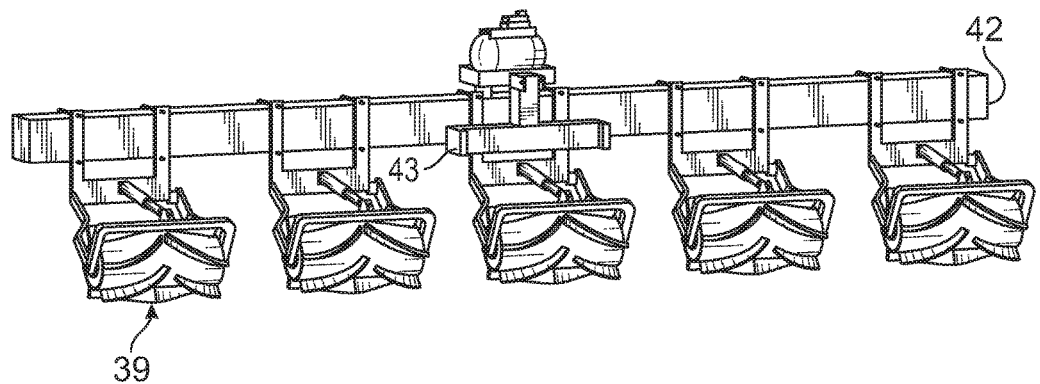
FIG. 13 shows a front angled view perspective of an embodiment of flex roller crimper middle units attached to a toolbar comprising the standalone implementation with a 3-point hitch attachment for connection to a tractor.

FIG. 13 illustrates an embodiment of a toolbar with flex roller crimper middle units installed. Flex roller crimper middle units attached alone to a toolbar 42 create a standalone agricultural implement to be used in season once crops have emerged. The toolbar 45 may be attached or pulled by 3-point hitch 43, drawbar (not shown), or other means as known in art.

Figure 14:
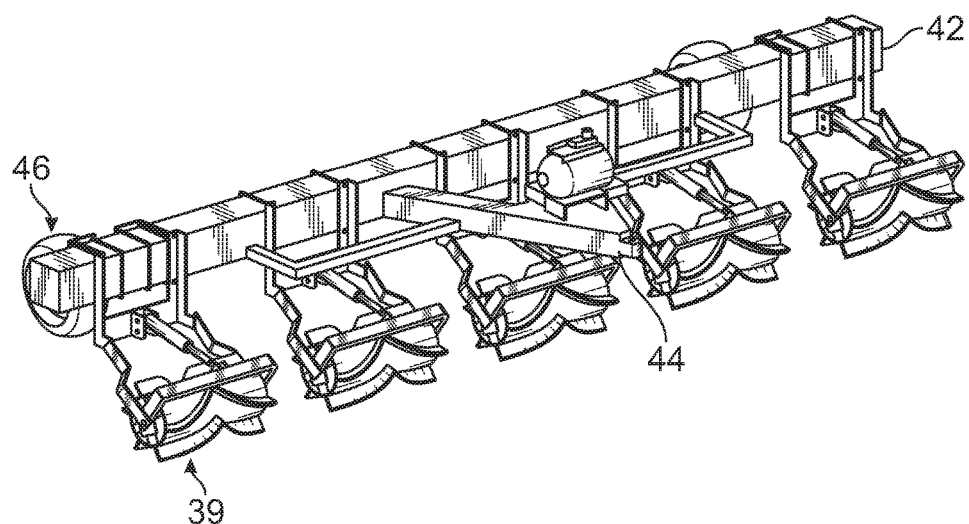
FIG. 14 shows a front angled view perspective of an embodiment of flex roller crimper middle units attached to a toolbar comprising the standalone implementation with a drawbar attachment for connection to a tractor or vehicle.

FIG. 14 illustrates a flex roller crimper standalone implement with a drawbar mount. Wheel assemblies 46 are attached to the toolbar by linkages understood by those skilled in the art. The wheel assemblies 46 possess pressure regulators that when retracted lift the wheels off of the ground, allowing the implement to traverse in a forward direction over the roller drums. When pressure regulators are extended, the roller drums are lifted off of the ground such that the implement made be transported.

Figure 15:
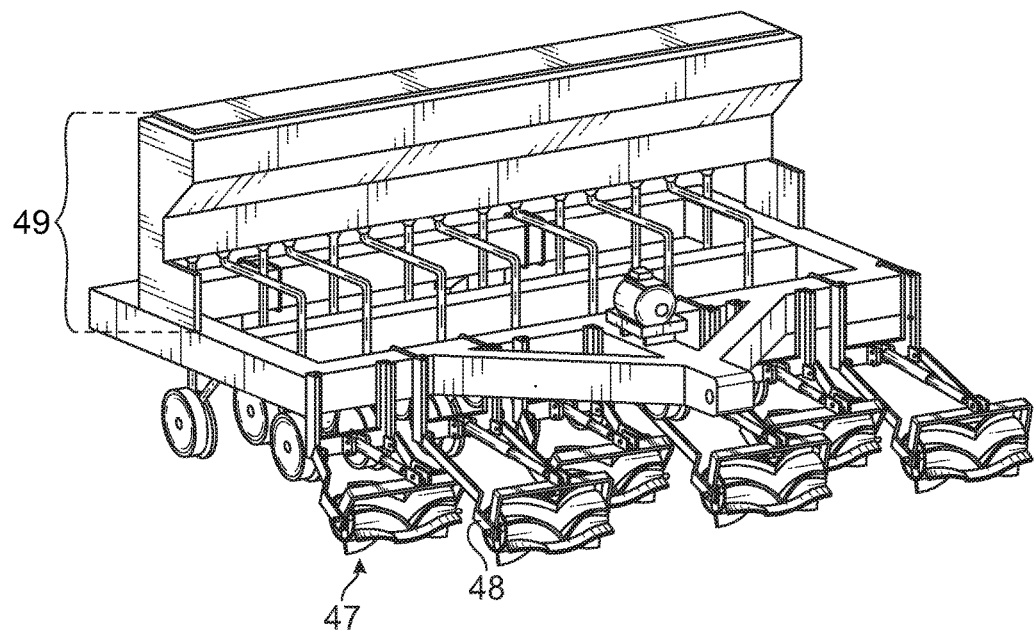
FIG. 15 shows a front angled view perspective of an embodiment of flex roller crimper middle units attached to the toolbar of a no-till single disc planter or drill.

FIG. 15 illustrates flex roller crimper middle units installed on a conventional no-till drill 49. Flex roller crimper middle units 47 are attached to the front toolbar of a no-till drill arranged similarly to strip and middle units on a no-till planter. Arm extensions 48 are installed to the v-link of alternating units such that the can be extended past the neighboring unit, allowing for broadcast ground coverage without having gaps between units.

Figure 16:
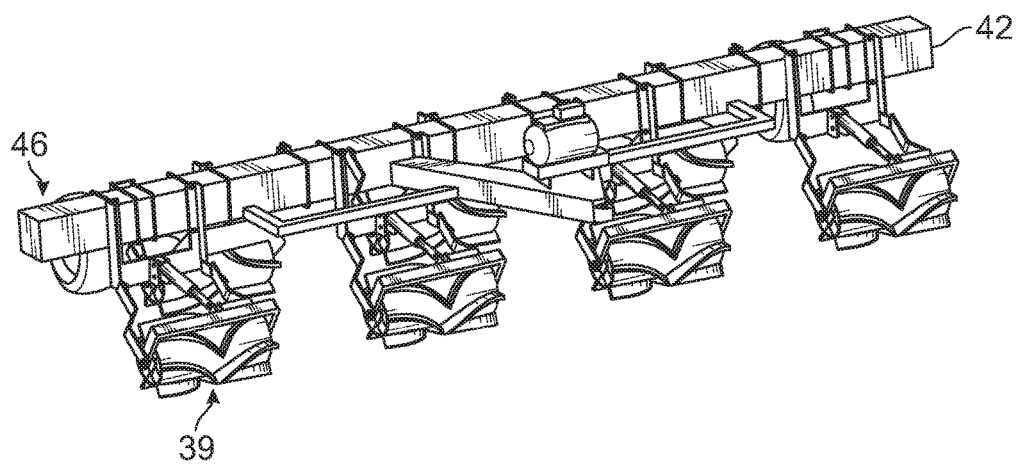
FIG. 16 shows a front angled view perspective of an embodiment of flex roller crimper middle units attached to an agricultural toolbar in an arrangement spanning the entire width of the implement.

FIG. 16 illustrates flex roller crimper middle units installed on an agricultural toolbar covering the entire span of the implement. Flex roller crimper middle units are attached to the frontward and rearward side of the toolbar, alternating through the progression of units along the span of the toolbar. From a frontward or rearward view perspective, there is no overlap or gaps between units, yet they are aligned such that the units all are arranged with ends falling on the same plane. Dual row flex roller crimper standalones would be advantageous in the event the user would like to use the system to terminate cover crops or other plant material prior to the time of action of planting or sowing the cash crop.

Figure 17:
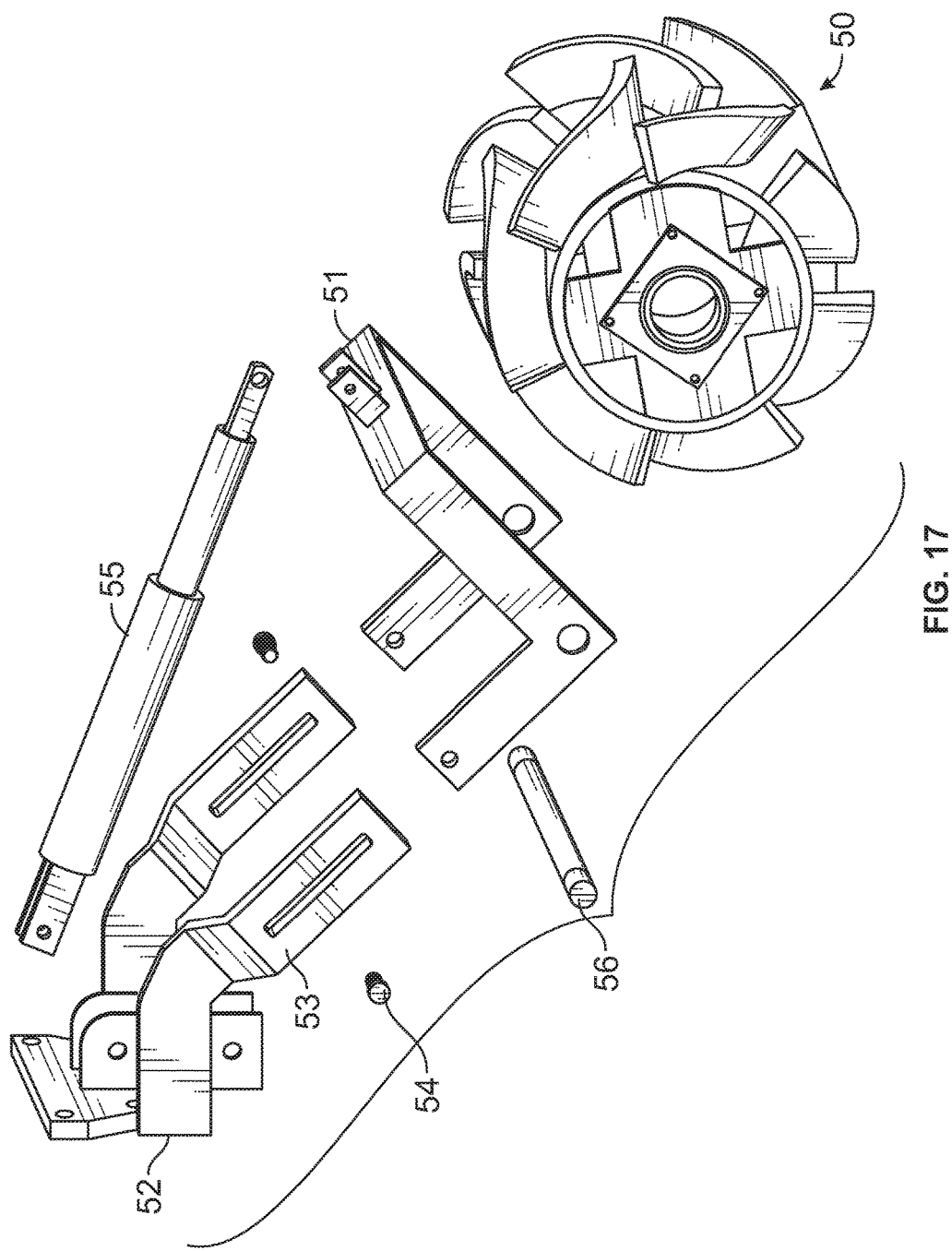
FIG. 17 shows an exploded side angled view perspective of an embodiment of the components of the flex roller crimper system with telescoping parallel arms.

FIG. 17 illustrates the components of a flex roller crimper telescoping parallel arm system. The system consists of a roller drum 50 connected to telescoping parallel arms 51 by a drum roller shaft 56. The telescoping arms move horizontally upward downward within the open channels fixed to the mounting plate 52. The slots 53 within the open channels of the telescoping parallel arms 50 act as a guide during this motion to the stop bolt 54. A pressure regulator 55 mediates desired pressure against or away from the ground surface.

Figure 18:
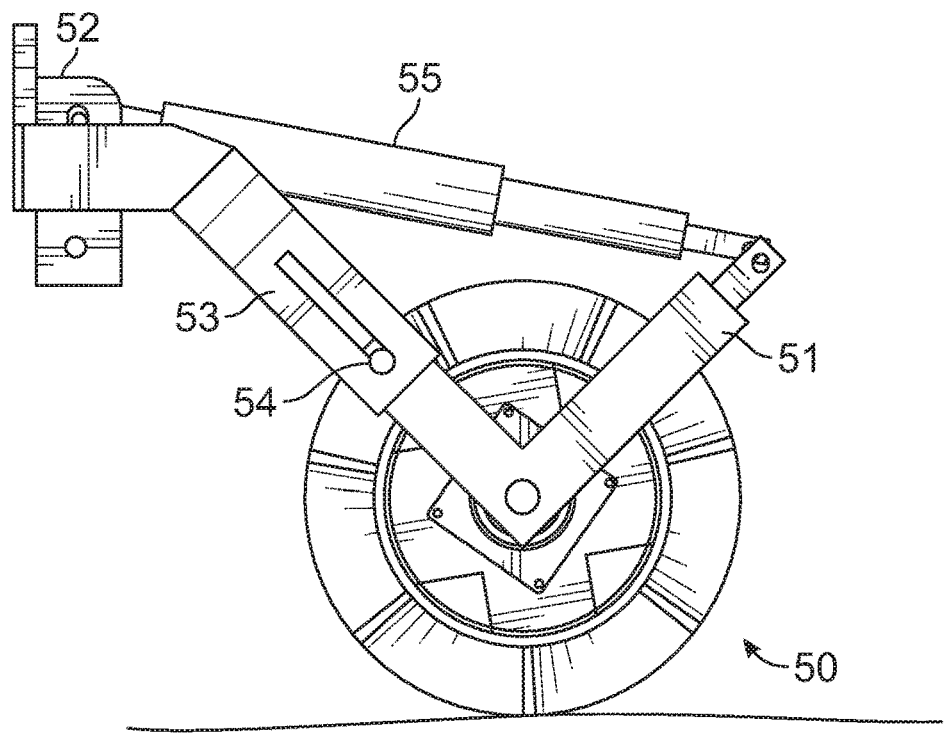
FIG. 18 shows a side view perspective of a flex roller crimper system with telescoping parallel arms extended to contact the ground surface.

FIG. 18 illustrates an embodiment of a flex roller crimper system with telescoping parallel arms 50 acting upon the ground 53. The telescoping arms 50 extended outwardly from the open channels guided by the stop bolt 54 fastened to the arms 50. The pressure regulator 55 forces the unit to continue to traverse along the ground surface as the set desired pressure.

Figure 19:
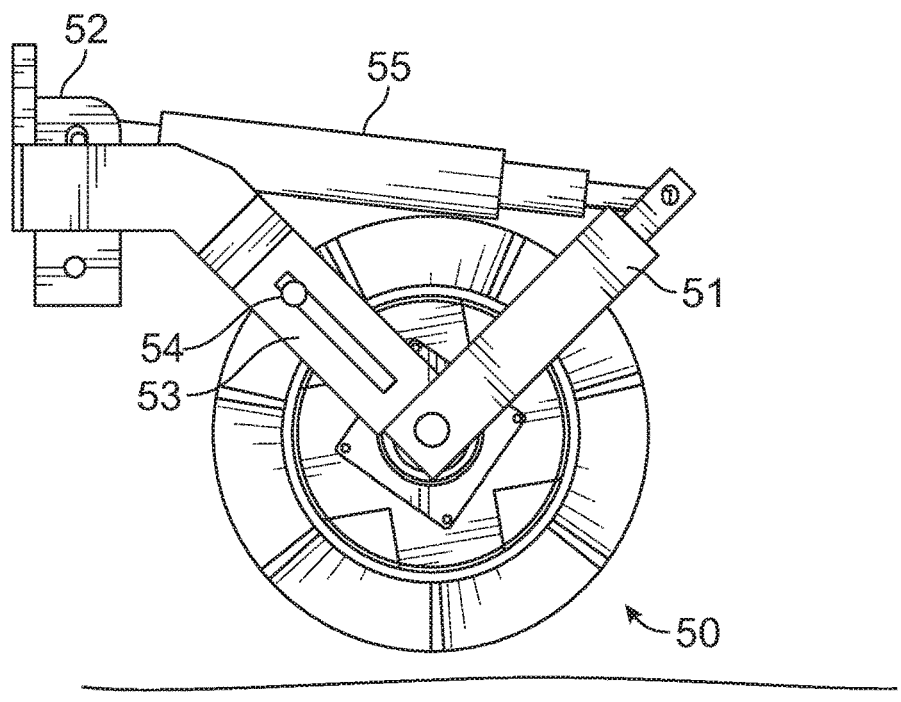
FIG. 19 shows a side view perspective of a flex roller crimper system with telescoping parallel arms retracted pulling the unit away from the ground surface.

FIG. 19 illustrates an embodiment of a flex roller crimper system with telescoping parallel arms retracted from the ground 56. The telescoping arms retract inwardly into the open channels guided by the stop bolt fastened to the arms 57. The pressure regulator 58 removes the unit from the ground surface in a storage position.

Figure 20:
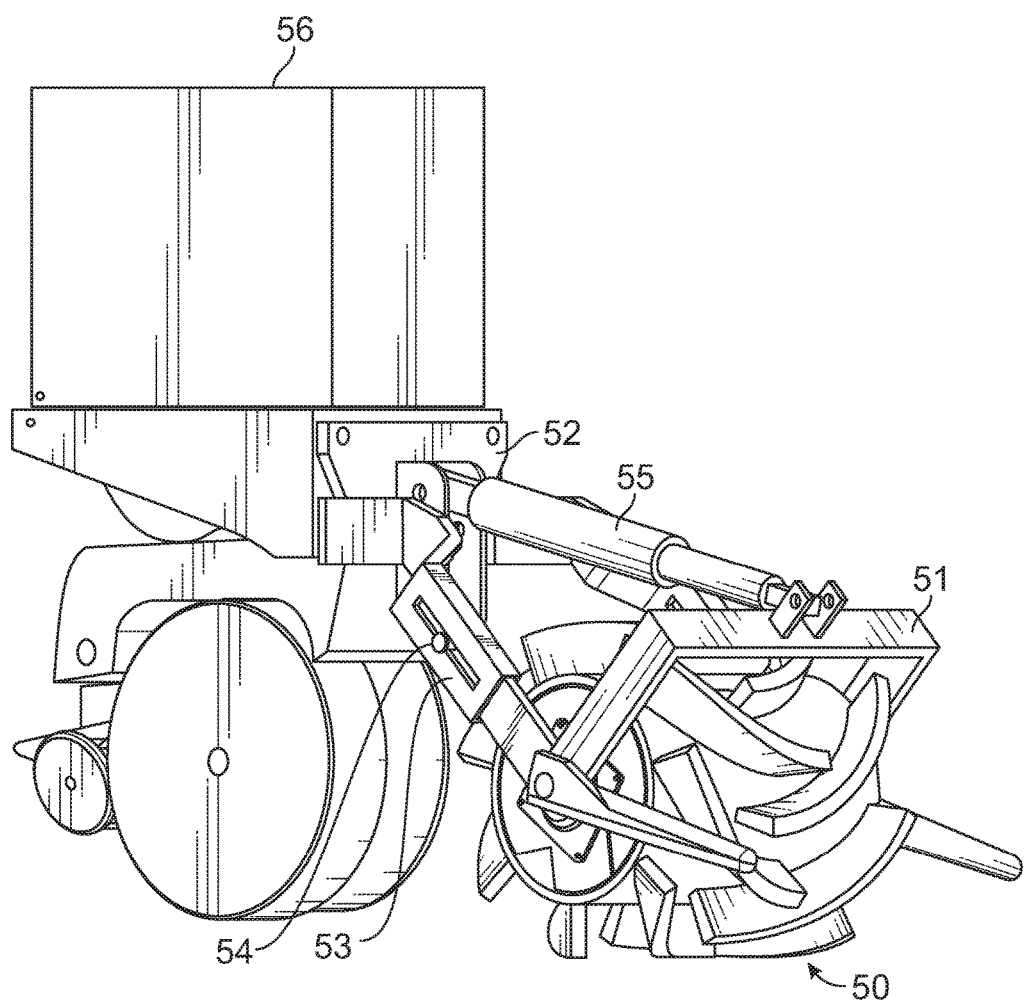
FIG. 20 shows a side angle view perspective of a flex roller crimper strip unit with telescoping parallel arms with stalk guide separators attached to a planter row unit.

FIG. 20 illustrates an embodiment of a flex roller crimper system with telescoping parallel arms and stalk guide separators attached to a planter row unit 56. Mounting plates are designed for specific applications and bolt patterns and can be attached to the frame or toolbar of any desired agricultural implement.

Figure 21:
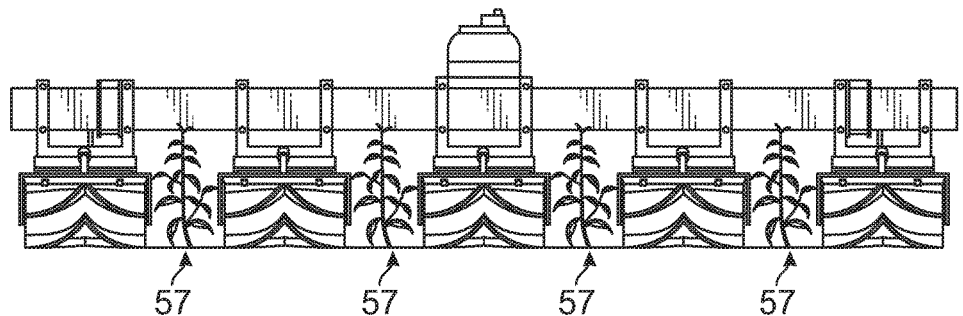
FIG. 21 shows a front view perspective of a flex roller crimper standalone unit operating in the area between emerged crop rows.

FIG. 21 illustrates a flex roller crimper standalone implement acting upon the area in between emerged crop rows 57. This application could be utilized to roller crimp existing cover crop, weed pests, or other undesirable plant material within the area between crop rows without using chemicals or tillage practices.

Figure 22:
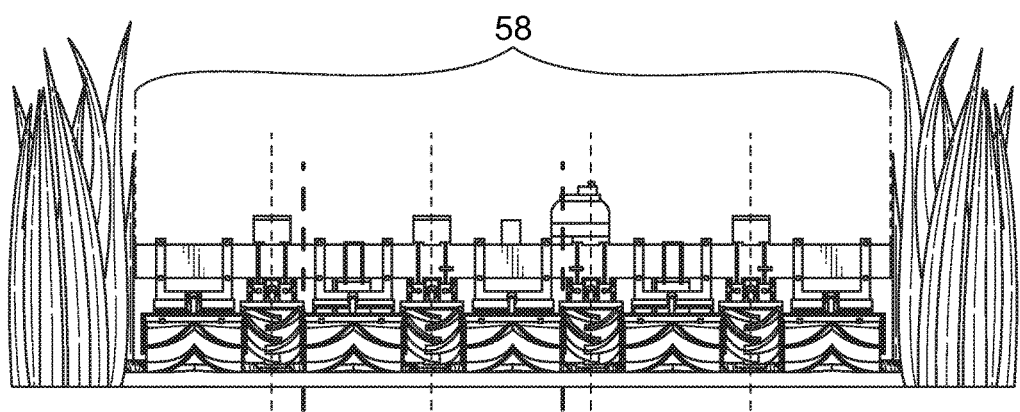
FIG. 22 shows a front view perspective of a flex roller crimper system attached to a planter demonstrating roller crimping of cover crops across the span of the implement.

FIG. 22 illustrates a flex roller crimper system attached to a conventional no-till planter. The flex roller crimper system rolls and crimpers cover crop the entire span of the implement in which it is installed as demonstrated without harming the soil profile.

The foregoing description and the examples are intended as illustrative and are not to be taken as limiting. Still other variations within the spirit and scope of this invention are possible and will readily present themselves to those skilled in the art.

The invention claimed is:

1. A modular rolling crimping device for crushing and terminating cover crops or plants materials comprising:
   a mounting plate to affix the device to an agricultural frame,
   parallel arms linkages pivotally attached to the mounting plate on a rearward side and extending away from the mounting plate having a crossbar member on a frontward side,
   a tensioning mechanism attached to the parallel arm linkages at the crossbar member on the frontward side and connecting to the mounting plate on the rearward side, the tensioning mechanism connected between the crossbar member and the mounting plate such that the tensioning mechanism is about parallel relative to the ground,
   a rolling-crimping cylindrical drum attached to the parallel arm linkages such that the rolling-crimping cylindrical drum can rotate and the rolling-crimping cylindrical drum comprising a plurality of outwardly projecting blades,
   the parallel arm linkages comprising a telescoping parallel arm system,
   the telescoping parallel arm system comprising a mounting plate with rigidly connected open channel parallel arms having internal telescoping parallel arms rigidly connected to the crossbar member,
   the telescoping parallel arms sliding within the open channels to fluidly and dynamically adjust in height to tension provided by the tensioning mechanism,
   the tensioning mechanism connected between the crossbar member and the mounting plate such that the tensioning mechanism is about parallel relative to the ground, a stop bolt positioned perpendicular through the open channel and the telescoping parallel arms to manipulate a minimum and maximum height adjustment ramie.

2. The modular rolling crimping device of claim 1, each of the plurality of blades arranged evenly about the cylindrical drum.

3. The modular rolling crimping device of claim 2, the plurality of blades arranged about the cylindrical drum in a helical pattern.

4. The modular rolling crimping device of claim 1, further comprising a stalk guide separator.

5. The modular rolling crimping device of claim 1, the tensioning mechanism is a pneumatic cylinder.

6. An agricultural device
comprising: a frame; and
a plurality of modular roller-crimping devices supported by the frame arranged in at least one row oriented in a direction that is transverse to a direction of travel of the agricultural device,
each of the plurality of modular roller-crimping devices having an exterior surface configured to at least partially crush stems of residual plant matter, and being individually movably mounted to the frame such that each of the plurality of roller-crimping devices will move at least vertically with respect to the frame when subjected to a temporary increase in resistance caused by an encounter with a non-uniform region in the field,
each of the plurality of modular crimping devices for crushing and terminating cover crops or plants materials comprising:
a mounting plate to affix the device to an agricultural frame,
parallel arm linkages pivotally attached to the mounting plate on a rearward side and extending away from the mounting plate having a crossbar member on a frontward side,
a tensioning mechanism attached to the parallel arm linkages at the crossbar member on the frontward side and connecting to the mounting plate on the rearward side, the tensioning mechanism being connected between the crossbar member and the mounting plate such that the tensioning device is about parallel relative to the ground,
a rolling-crimping cylindrical drum attached to parallel arm linkages such that the rolling-crimping cylindrical drum can rotate,
the parallel arm linkages comprising a telescoping parallel arm system, the telescoping parallel arm system comprising a mounting plate with rigidly connected open channel parallel arms having internal telescoping parallel arms rigidly connected to a crossbar member,
the telescoping parallel arms sliding within the open channel parallel arms to fluidly and dynamically adjust in height to tension provided by the tensioning mechanism, the tensioning mechanism connected between the crossbar member and the mounting plate such that the tensioning mechanism is about parallel relative to the ground, a stop bolt positioned perpendicular through the open channel allowing the telescoping parallel arms to manipulate a minimum and maximum height adjustment range.

7. The agricultural device of claim 6, the plurality of roller-crimping devices comprising at least one row middle unit.

8. The agricultural device of claim 6, the plurality of roller-crimping devices comprising at least one strip unit.

9. The agricultural device of claim 6, the plurality of roller-crimping devices comprise at least two row middle units.

10. The agricultural device of claim 8, wherein the at least one strip unit is flanked on opposite sides by a respective one of at least two row middle units.

11. The agricultural device of claim 8, the at least one strip unit is positioned on the frame to operate on plant material located in a planted row area.

12. The agricultural device of claim 9, the at least two row middle units are positioned on the frame to operate on plants located between planted rows.

13. The agricultural device of claim 10, each of the at least one strip unit and the at least two row middle units are attached to the frame and located alternately in rows so that adjacent ones of the plurality of roller-crimping devices are located in a different row.

14. The agricultural device of claim 13, the at least two row middle units are located in a different row than the at least one strip unit.

* * * * *